United States Patent
Izumi et al.

(10) Patent No.: US 10,008,303 B2
(45) Date of Patent: Jun. 26, 2018

(54) JOINED BODY AND METHOD FOR MANUFACTURING THE SAME

(71) Applicant: NGK Insulators, Ltd., Nagoya (JP)

(72) Inventors: Yunie Izumi, Nisshin (JP); Yoshimasa Kobayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 304 days.

(21) Appl. No.: 14/873,327

(22) Filed: Oct. 2, 2015

(65) Prior Publication Data

US 2016/0099089 A1    Apr. 7, 2016

Related U.S. Application Data

(60) Provisional application No. 62/059,219, filed on Oct. 3, 2014.

(51) Int. Cl.
| | | |
|---|---|---|
| *H01B 5/00* | (2006.01) |
| *C04B 38/00* | (2006.01) |
| *F01N 3/027* | (2006.01) |
| *C04B 37/02* | (2006.01) |
| *H01B 1/04* | (2006.01) |
| *H01B 1/08* | (2006.01) |

(Continued)

(52) U.S. Cl.
CPC ........... *H01B 5/002* (2013.01); *C04B 37/023* (2013.01); *C04B 38/0019* (2013.01); *F01N 3/027* (2013.01); *H01B 1/04* (2013.01); *H01B 1/08* (2013.01); *H01B 13/0016* (2013.01); *C04B 2111/00793* (2013.01); *C04B 2237/123* (2013.01); *C04B 2237/124* (2013.01)

(58) Field of Classification Search
None
See application file for complete search history.

(56) References Cited

U.S. PATENT DOCUMENTS

| | | |
|---|---|---|
| 4,497,875 A | 2/1985 | Arakawa et al. |
| 4,629,662 A | 12/1986 | Brownlow et al. |
| 6,890,665 B1 | 5/2005 | Tanida |

(Continued)

FOREIGN PATENT DOCUMENTS

| | | |
|---|---|---|
| EP | 2 977 363 A1 | 1/2016 |
| EP | 2 977 364 A1 | 1/2016 |

(Continued)

OTHER PUBLICATIONS

U.S. Appl. No. 14/873,263, filed Oct. 2, 2015, Izumi et al.

(Continued)

*Primary Examiner* — Nicholas W. Jordan
(74) *Attorney, Agent, or Firm* — Burr & Brown, PLLC

(57) ABSTRACT

A joined body includes a first member, a second member having a high coefficient of thermal expansion as compared to that of the first member, and a joint portion which at least partially includes a mixed layer containing metal of a transition metal and an oxide of the transition metal and which joins the first member and the second member. In this joint portion, a first layer containing a first oxide of a transition metal, a second layer containing a second oxide of a transition metal having a low valence as compared to that of the first oxide, and the mixed layer containing metal of a transition metal and an oxide thereof preferably are formed so as to form a multilayer structure.

14 Claims, 9 Drawing Sheets

(51) Int. Cl.
*H01B 13/00* (2006.01)
*C04B 111/00* (2006.01)

(56) References Cited

U.S. PATENT DOCUMENTS

| | | |
|---|---|---|
| 8,137,802 B1 | 3/2012 | Loehman et al. |
| 2015/0344041 A1 | 12/2015 | Green |
| 2016/0002110 A1* | 1/2016 | Izumi ...................... B32B 15/04 428/332 |

FOREIGN PATENT DOCUMENTS

| | | |
|---|---|---|
| JP | 05-286776 A1 | 11/1993 |
| JP | 06-001670 A1 | 1/1994 |
| JP | 2001-220252 A1 | 8/2001 |
| JP | 2005-330524 A1 | 12/2005 |
| JP | 2011-246340 A1 | 12/2011 |
| WO | WO-2014148533 A1 * | 9/2014 ........... C04B 37/023 |

OTHER PUBLICATIONS

U.S. Appl. No. 14/873,311, filed Oct. 2, 2015, Izumi et al.
U.S. Appl. No. 14/873,348, filed Oct. 2, 2015, Izumi et al.
U.S. Appl. No. 14/873,291, filed Oct. 2, 2015, Izumi et al.
U.S. Office Action (Related U.S. Appl. No. 14/873,263) dated May 15, 2017.
Extended European Search Report (Application No. 15188203.2) dated Feb. 12, 2016.
U.S. Appl. No. 14/848,938, filed Sep. 9, 2015, Izumi, et al.
U.S. Appl. No. 14/856,629, filed Sep. 17, 2015, Izumi, et al.

\* cited by examiner

JOINED BODY AND METHOD FOR MANUFACTURING THE SAME

The present application claims priority from U.S. Provisional Application No. 62/059,219 filed on Oct. 3, 2014, the entire contents of which are incorporated herein by reference.

BACKGROUND OF THE INVENTION

1. Field of the Invention

The present invention relates to a joined body and a method for manufacturing the same.

2. Description of the Related Art

Hitherto, as a joined body, a joined body in which a pair of electrodes each formed of a metal layer are provided on a surface of a honeycomb body formed of a porous ceramic has been proposed (for example, see Patent Literature 1). According to this joined body, the metal layer contains Cr and/or Fe, a diffusion layer formed of a metal silicide is present at a boundary portion with the honeycomb body, and the reliability of the electrical joining is ensured in a high-temperature environment. In addition, as the joined body, a joined body has been proposed in which pores of a porous ceramic are filled with a ceramic, and a metal component is joined to the porous ceramic with an active metal-containing solder material interposed therebetween (for example, see Patent Literature 2). In this joined body, the porous ceramic and the metal component are joined to each other using an Ag—Cu eutectic crystal. In addition, as the joined body, a joined body in which a ceramic member formed of a silicon nitride sintered body and a metal member are joined to each other with a buffer layer interposed therebetween has been proposed (for example, see Patent Literature 3). In this joined body, there is provided a buffer layer in which a silicon nitride sintered body layer containing 5 to 20 percent by mass of a nitride of an active metal, a low-Young's modulus metal layer formed of a transition metal and an alloy thereof, and a silicon nitride sintered body layer containing 25 to 70 percent by mass of a nitride of an active metal are sequentially arranged.

CITATION LIST

Patent Literature

PTL 1: JP 2011-246340 A
PTL 2: JP 2001-220252 A
PTL 3: JP 06-1670 A

SUMMARY OF THE INVENTION

However, in the joined bodies disclosed in Patent Literatures 1 to 3, since a joint layer is formed of a metal, when a thermal history is repeatedly applied thereto, joining reliability, such as mechanical and electrical joining performance, is disadvantageously degraded.

The present invention was made in consideration of the problem as described above, and a primary object of the present invention is to provide a joined body in which two members can be more simply and more reliably joined to each other and a method for manufacturing a joined body.

Through intensive research carried out to achieve the above primary object, the present inventors found that when a first member and a second member are joined to each other with an oxide in which the valence of a transition metal is gradually changed from the first member to the second member, sore reliable joining can be obtained, and hence, the present invention was made.

That is a joined body of the present invention comprises:
a first member;
a second member having a high coefficient of thermal expansion as compared to that of the first member; and
a joint portion which at least partially includes a mixed layer containing metal of a transition metal and an oxide thereof and which joins the first member and the second member.

A method for manufacturing a joined body of the present invention is:
a method for manufacturing a joined body in which a first member and a second member having a high coefficient of thermal expansion as compared to the first master are joined to each other,
the method comprising: a joining step of forming a joint layer containing a metal powder of a transition metal powder and an oxide powder of a transition metal between the first member and the second member so that the addition amount of the oxide powder with respect to the total of the metal powder and the oxide powder is in a range of 2 to 10 percent by mass, and firing in an oxidizing atmosphere at a firing temperature of 750° C. to 850° C. for a holding time of 5 hour or less so as to form a joint portion which at least partially includes a mixed layer containing metal of the transition metal and an oxide thereof and which joins the first member and the second member.

In the joined body and the method for manufacturing the same of the present invention, the first member and the second are joined to each other with the joint portion which at least partially includes the mixed layer containing metal of a transition metal and an oxide thereof. Since containing the oxide, this joint portion has a thermal history resistance superior to that of a joint portion formed of a metal. Hence, the two members can be more reliably joined to each other. In addition, in the present invention, since firing is performed after the joint layer containing a transition metal is formed, the two members can be joined to each other by a simple step.

DESCRIPTION OF THE PREFERRED EMBODIMENTS

Figure 1:
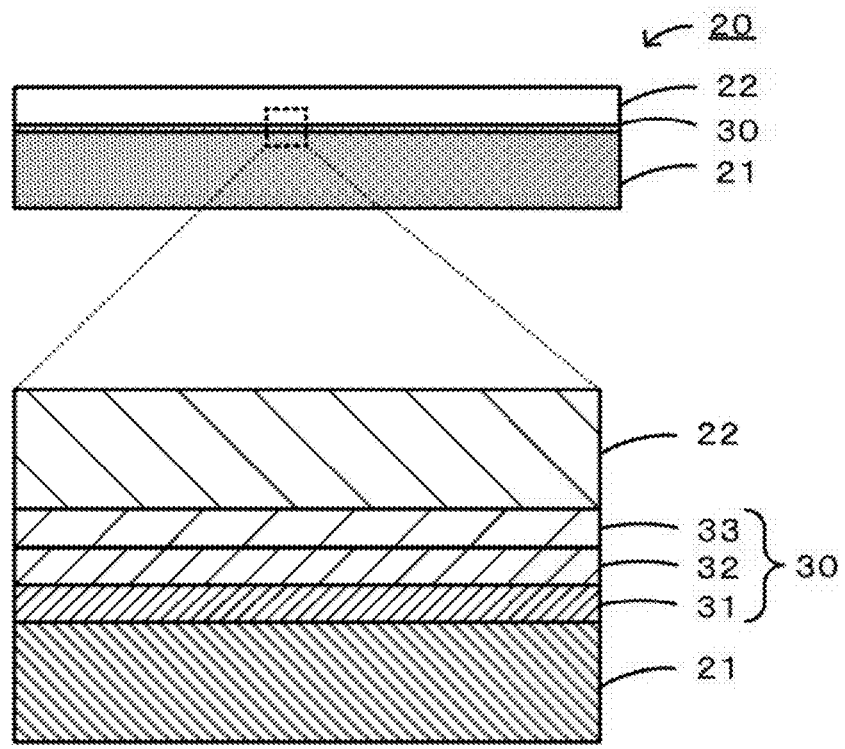
FIG. 1 is an explanatory view schematically showing one example of the structure of a joined body 20.
Figure 2:
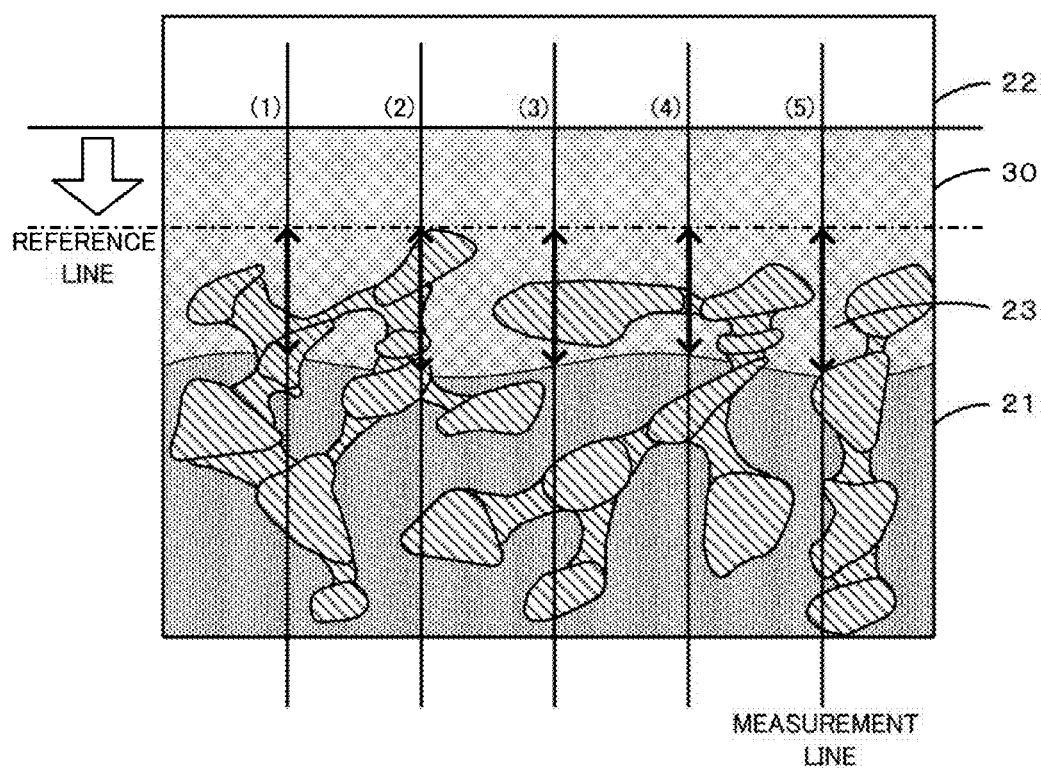
FIG. 2 is an explanatory view illustrating an intrusion depth into a porous ceramic of a joint portion 30.
Figure 3:
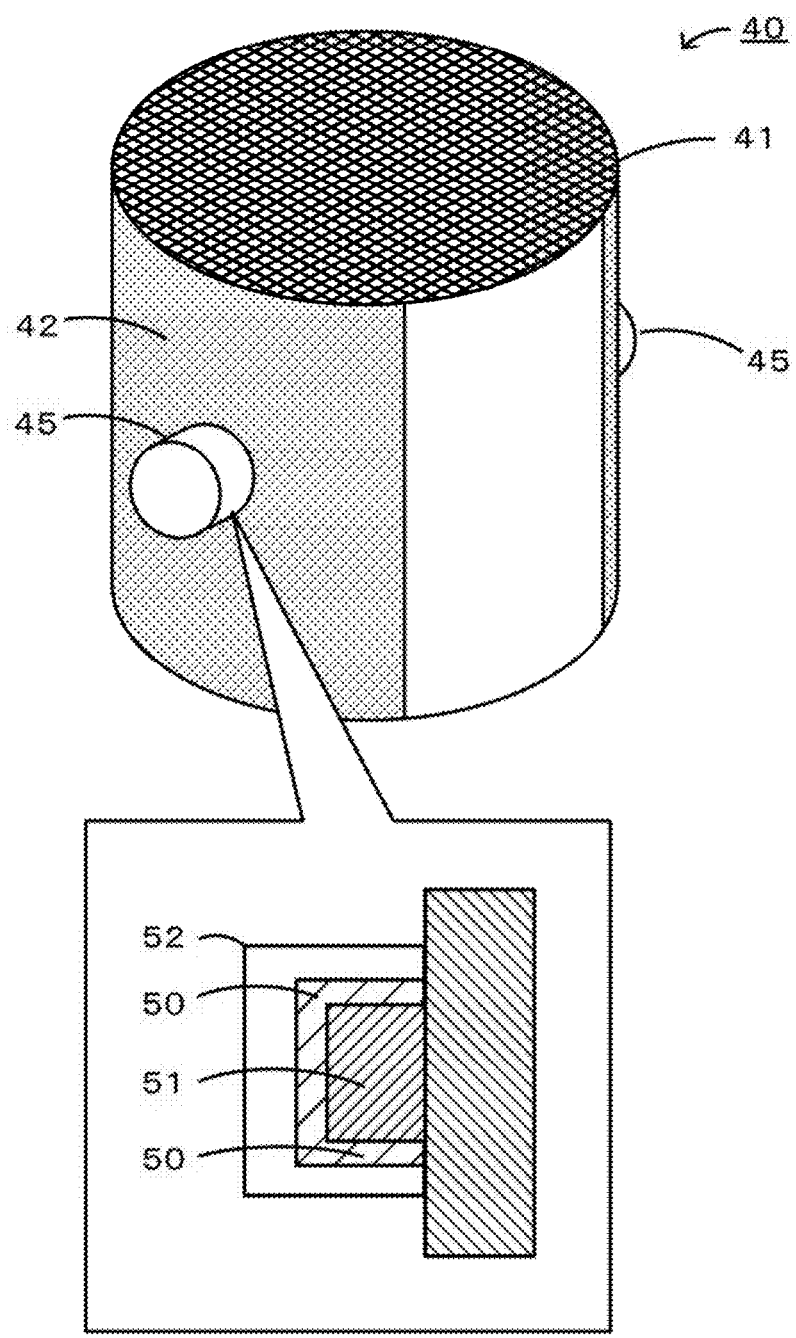
FIG. 3 is an explanatory view of a honeycomb structural body 40 which is one example of the joined body 20.
Figure 4:
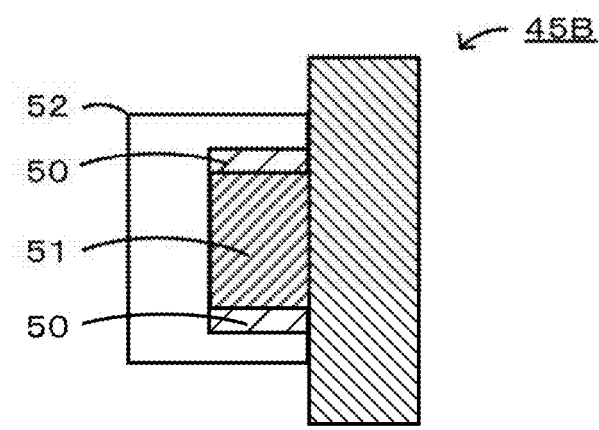
FIG. 4 is an explanatory view of an electrode portion 45B.

Next, modes for carrying out the present invention will be described, with reference to the drawings. FIG. 1 is an explanatory view schematically showing one example of the structure of a joined body 20 according to one embodiment of the present invention. FIG. 2 is an explanatory view illustrating an intrusion depth into a porous ceramic of a joint portion 30. FIG. 3 is an explanatory view of a honeycomb structural body 40 which is one example of the joined body 20. FIG. 4 is an explanatory view of an electrode portion 45B.

A joined body 20 include a first member 21, a second member 22 having a high coefficient of thermal expansion (CTE, ppm/K) as compared to that of the first member 21, and a joint portion 30 which at least partially includes a mixed layer 33 containing metal of a transition metal and an oxide thereof and which joins the first member 21 and the second member 22. In addition, the first member 21 and the second member 22 are called a low CTE member and a high CTE member, respectively, in some cases.

The first member 21 and the second member 22, each of which is an object to be joined, each may be either a porous ceramic or a dense material. In addition, the first member 21 and the second member 22 each may be either a member having electrically conductive properties or a member having no electrically conductive properties. Since a transition metal and an oxide thereof each have relatively high electrically conductive properties, the first member 21 and the second member 22 preferably have electrically conductive properties, and the joined body 20 preferably has electrically conductive properties. Incidentally, the term "having electrically conductive properties" indicates the case in which the electrical conductivity is $10^{-6}$ S/cm or more, and the term "having no electrically conductive properties" indicates the case in which the electrical conductivity is less than $10^{-6}$ S/cm.

The porous ceramic is not particularly limited as long as having a porous property. As a ceramic having a porous property, a ceramic at least having open pores in its surface may be mentioned. For example, although a ceramic having a porosity of 10 percent by volume or more may be used, the porosity is preferably 20 percent by volume or more and more preferably 40 percent by volume or more. In addition, in view of easy formation, the porosity is preferably 90 percent by volume or less. The porosity of the porous ceramic may be appropriately selected in accordance with the application. The average pore diameter of this porous ceramic is preferably, for example, in a range of 1 to 300 μm. When the average pore diameter is in the range described above, the joint portion 30 is likely to intrude into pores of the porous ceramic and may be more tightly joined thereto. This average pore diameter is more preferably 5 μm or more and further preferably 10 μm or more. In addition, this average pore diameter is more preferably 100 μm or less and further preferably 50 μm or less. In addition, the porosity and the average pore diameter of the porous ceramic described above each indicate the measurement result obtained by a mercury intrusion method.

The porous ceramic may be formed so as to contain at least one inorganic material selected, for example, from a carbide, such as silicon carbide, titanium carbide, zirconium carbide, or a boron carbide; a nitride, such as silicon, nitride, aluminum nitride, titanium nitride, or zirconium nitride; an oxynitride such as sialon; a silicide such as molybdenum silicide; and zirconium phosphate. In addition, the porous ceramic may be formed so as to contain at least one inorganic material selected, for example, from cordierite, mullite, zeolite, aluminum titanate, aluminum oxide, zirconium oxide, titanium oxide, silicon oxide, and magnesium oxide. Although the shape of the porous ceramic is not particularly limited and may be selected in accordance with the application, for example, a plate, a cylindrical, and a honeycomb shape may be mentioned, and the structure through which a fluid is allowed to pass may also be selected. In particular, this porous ceramic may be a honeycomb structural body having a partition portion which forms a plurality of cells each functioning as a flow path of a fluid.

The joint portion 30 may be a portion which intrudes into pores 23 of the porous ceramic and joins this porous ceramic to another member. A depth (intrusion depth) of intrusion of this joint portion 30 into the pores of the porous ceramic is preferably 10 μm or more. The reason for this is that the joining strength can be further increased. This intrusion depth is more preferably 15 μm or more and further preferably 20 μm or more. In addition, this intrusion depth is preferably in a range of 50 μm or less. A measurement method of this intrusion depth will be described. As shown in FIG. 2, a cross-section in which the first member 21 of the porous ceramic, the second member 22, and the joint portion 30 can be simultaneously observed is mirror-polished. This polished surface is observed using a scanning electron microscope (SEM) at a magnification of 200 times, and a microstructure picture is taken thereby. Next, in the image thus taken, a line in parallel to the line at the bottom end of the second member 22 is drawn so as to be in contact with the topmost portion of the porous ceramic. This line thus drawn is regarded as a reference line (a chain line in FIG. 2), and the intrusion depth at this line is set to 0. Next, the reference line is equally divided, into six segments, and five linear lines orthogonal to the reference line are drawn and are used as measurement, lines (lines (1) to (5) in FIG. 2). The intersection between the reference line and each measurement line is regarded, as a starting point, the intersection between the measurement line and the bottom end of the joint portion 30 is regarded as an end point, and the length therebetween is measured for each of the five measurement lines. The length of each of the five lines in consideration of the magnification used in the picture taking is obtained, and the average value calculated therefrom is regarded as the intrusion depth.

Any dense member having a low porosity may be used as the dense material, and for example, either a metal member or a dense ceramic may be used. The dense material may be a material having a porosity of 5 percent by volume or less, and the porosity is preferably 1 percent by volume or less and more preferably 0.5 percent by volume or less. Although the metal member is not particularly limited as long as being formed of a metal, such as a typical metal or a transition metal, a metal member having high electrically conductive properties is preferable. As the transition metal, a metal, such as Fe, Co, Ni, or Cu, and an alloy thereof are preferable. In addition, in accordance with the application, a noble metal, such as Pt or Au, may also be used. This metal member may be used as an electrode, and in this case, for example, stainless steel, such as a Cr—Ni—Fe-based alloy (SUS304) or a Cr—Fe-based alloy (SUS430), is preferably used. This metal member is preferably an alley containing at least Fe and Cr, and an alley at least containing 70 to less than 90 percent by mass of Fe and 10 to less than 30 percent by mass of Cr is more preferable. The reasons for this are that the material quality is stable, and the electrically conductive properties are excellent. The shape of the metal member may be appropriately selected from a plate or the like in accordance with the application. As the dense ceramic, for example, a ceramic obtained by densely sintering any one of the materials mentioned above as the porous ceramic, a member formed by filling a filler or an impregnant in the pores of the above porous ceramic, or a composite oxide member containing at least two types of metals may be mentioned. As the member formed by filling, in particular, for example, a Si-impregnated SiC sintered body in which pores of porous SiC are impregnated with metal Si nay be mentioned. This material has good thermally conductive properties and also has high electrically conductive properties due to the presence of the metal Si. In addition, as the composite oxide member, for example, an electrically conductive ceramic material, such as a $LaCrO_3$-based material, a $BaTiO_3$-based material, a $LaMnO_3$-based material, a $LaCoO_3$-based material, a $NaCo_2O_4$-based material, a $Ca_3Co_4O_9$-based material, a $LaNiO_3$-based material, or a $SrTiO_2$-based material, may be mentioned. In addition, the term "-based material" is meant to include a material which is partially substituted by an alkali metal element, an alkaline earth metal element, and/or an element having a different valence. In particular, in the $LaMnO_3$-based, material, for example, $(La_{0.9}Sr_{0.1})MnO_3$ may be mentioned.

The difference in coefficient of thermal expansion between the first member 21 and the second member 22 may be set to 4.0 ppm/K or more. Even in a joined body formed by joint members having a relatively large difference in coefficient of thermal expansion, by joint portion, the joining strength and the electrically conductive properties can be maintained. In particular, even in a joined body which is to be repeatedly used by heating, the joining strength and the electrically conductive properties can be maintained. The difference in coefficient of thermal expansion may be set to 6.0 ppm/K or more and may also be set to 15 ppm/K or less. For example, as for the coefficient of thermal expansion, a Cr—Ni—Fe-based alloy (SUS304) has 18 ppm/K, a Cr—Fe-based alloy (SUS430) has 12 ppm/K, a Si-bonded SiC sintered body has 4.6 ppm/K, a porous $Al_2O_3$ body has 7.0 ppm/K, and $LaCrO_3$ has 9.4 ppm/K.

The joint portion 30 of the present invention at least includes the mixed layer 33 containing metal of a transition metal and an oxide thereof. As the transition metal contained in the joint portion 30, for example, Fe, Mn, Co, Ni, and Cu may be mentioned, and among those elements, at least one of Fe and Cu is preferable. As shown in FIG. 1, in this joint portion 30, a first layer 31 containing a first oxide of a transition metal, a second layer 32 containing a second oxide of a transition metal having a low valence as compared to that of the first oxide, and the mixed layer 33 may be formed in this order from the first member 21 to the second member 22 so as to form a multilayer structure. Accordingly, it is preferable since the durability can be further enhanced. The multilayer structure described above is also called a gradient layer. In addition, the joint portion 30 may include the first layer 31 and the mixed layer 33 or may include the second layer 32 and the mixed layer 33. In this case, in the joint portion 30, the thickness of the mixed layer 33 with respect to the total thickness of this joint portion 30 is preferably in a range of 10% to 85%, more preferably 30% or more, and further preferably 40% or more. In addition, in the joint portion 30, the thickness of the second layer 32 with respect to the total thickness of this joint portion 30 is preferably in a range of 9% to 70%, more preferably in a range of 10% to 60%, and further preferably in a range of 20% to 50%. In addition, in the joint portion 30, the thickness of the first layer 31 with respect to the total thickness of this joint portion 30 is preferably in a range of 1.5% to 15%, more preferably in a range of 2.0% to 12%, and further preferably in a range of 2.5% to 10%. In the joint portion 30, the transition, metal may be Fe, the first oxide may be $Fe_2O_3$, and the second oxide may be $Fe_3O_4$. Alternatively, in the joint portion 30, the transition metal may be Cu, the first oxide may be CuO, mid the second oxide may be $Cu_2O$. For example, when, the first member 21 is a ceramic, and the second member 22 is a metal member, it is preferable since the affinity between the first member 21 and the first oxide being an oxide is high, and the affinity between the second member 22 and the mixed layer 33 containing a metal is also high. In addition, it is preferable since the valence of the transition metal is gradually decreased from the first member 21 to the second member 22.

In the joint portion 30, it is preferable that the transition metal is Fe, and that at least one of Mn, Co, Ni, Cu, and Zn (hereinafter also called a solid solution component) is solid-dissolved in the oxide of the transition metal. Accordingly, the joint portion can be made more thermally stable. It is preferable since the solid solution component, such as Mn, Co, Ni, Cu, or Zn, is able to form a spinel structure and is likely to be solid-dissolved in $Fe_3O_4$. Among those elements, as the solid solution component, Ni is preferable. In a Fe oxide of the joint portion 30, the solid solution component is solid-dissolved preferably in a range of 0.5 to 30 percent by mass, more preferably in a range of 1 to 25 percent by mass, and further preferably in a range of 1 to 15 percent by mass. In the range described above, a high joining strength can be preferably obtained, and the heat resistance is also preferably high.

A Fe oxide included in the joint portion 30 may contain a $Fe_3O_4$ phase in which Ni is solid-dissolved and may have a peak shift of 0.02° or more of the (751) plane of $Fe_3O_4$ by x-ray diffraction using the CuKα line. Accordingly, the oxide ceramic can be made more thermally stable. This peak shift is more preferably 0.05° or more and may also be set to 0.1° or more. In addition, the Fe oxide included in the joint portion 30 may contain a $Fe_2O_3$ phase in which Ni is solid-dissolved and may have a peak shift of 0.02° or more of the (410) plane of $Fe_2O_3$ by x-ray diffraction using the CuKα line. Accordingly, the boning portion 30 can be made further thermally stable. This peak shift is more preferably 0.04° or more and may also be set to 0.05° or more. In addition, the Fe oxide nay not contain a crystal phase of $Fe_2MO_4$ (where M represents a solid solution component). Since this $Fe_2MO_4$ has low electrically conductive properties, when a joined body having electrically conductive properties is to be formed, the presence of this crystal phase is not preferable.

In the joint portion 30, an oxide of the solid solution component may co-exist. For example, when the primary component of the joint portion 30 is a $(Fe,Ni)_3O_4$ phase, NiO, which is an oxide of the solid solution component, may also be present in the form of a crystal phase, and when the primary component of the joint portion 30 is a $(Fe,Mn)_3O_4$ phase, an oxide, such as MnO, $MnO_2$, $Mn_2O_3$, or $Mn_3O_4$, may also co-exist. In addition, in the joint portion 30, metal of a transition metal may also remain.

In addition, in the joined body formed by joining the first member 21 and the second member 22, each having electrically conductive properties, the electrical conductivity of the joint portion 30 is preferably $1 \times 10^{-1}$ (S/cm) or more. The electrical conductivity of the joint portion 30 is more preferably 1 (S/cm) or more, and further preferably 10 (S/cm) or more. As the electrical conductivity is higher, the electrically conductive properties are improved, and the electricity can be efficiently used as the joined body; however, in consideration of materials to be used in combination, the upper limit may be approximately $10^3$ (S/cm). The electrical conductivity may be obtained as described below. After a hole is formed in a part of the joint portion of the joined body, an Ag electrode is baked on an exposed joint material, and the electrical resistance is measured by bringing a measurement needle into contact therewith. After the resistance thus measured is converted into the volume resistivity using the electrode area and the distance between terminals, the reciprocal of the volume resistivity is then obtained as the electrical conductivity.

In the joined body of the present invention, the joining strength between die first member and the second member is preferably 3.5 MPa or more. The joining strength is measured by a four-point bending test (JIS-R1632). In addition, this joining strength, is more preferably 5.0 MPa or more and further preferably 10 MPa or more. As the joining strength is increased, a stronger joining is obtained, and the reliability is preferably enhanced; however, in consideration of materials to be used in combination, the upper limit may be approximately 500 MPa.

The joined body 20 is not particularly limited as long as having the structure in which the first member 21 and the second member 22 are joined to each other, and for example, the joined body may be used, for example, for a honeycomb structural body, a thermoelectric element, a ceramic heater, or a gas detecting sensor for oxygen, $NO_x$, or the like. For example, in the case of the honeycomb structural body, the joined body may be preferably used as a device or the like which heats the honeycomb structural body by applying the voltage to metal members. The first member may be a part of a honeycomb structural body including: a partition wall formed of a porous ceramic which forms and defines a plurality of cells, the cells each functioning as a flow path of a fluid and extending from one end surface to the other end surface; and an outer circumference wall formed along the outermost circumference. In addition, the second member may be a metal member. As shown in FIG. 3, a honeycomb structural body 40 is configured to heat a honeycomb substrate 41 by applying the voltage between electrode portions 45. This honeycomb structural body 40 includes the honeycomb substrate 41, a high electrically conductive portion 42 having high electrically conductive properties as compared to those of the honeycomb substrate 41, and the electrode portions 45 connected to the high electrically conductive portion 42. The electrode portion 45 an electrode terminal protrusion portion 51 connected to the high electrically conductive portion 42, a metal terminal portion 52 which is a metal member, and a joint portion 50 electrically and mechanically connecting the electrode terminal protrusion portion 51 the metal terminal portion 52. This joint portion 50 contains at least a mixed layer 33 as is the joint portion 30. In this electrode portion 45, the first member 21 is the electrode terminal protrusion portion 51 formed to have a convex shape or a concave shape, the second member 22 is the metal terminal portion 52 which is formed so that a portion to be joined to the electrode terminal protrusion portion 51 has a concave shape or a convex shape complementary to the shape of the electrode terminal protrusion portion 51, and the joint portion 50 electrically connects the electrode terminal protrusion portion 51 and the metal terminal portion 52 at a portion between the concave shape and the convex shape at which the electrode terminal protrusion portion 51 and the metal terminal portion 52 are engaged with each other. In this case, as shown by an electrode portion 45B of FIG. 4, the electrode terminal protrusion portion 51 and the metal terminal portion 52 may form no space between a protruding front end of the convex shape and a bottom part of the concave shape, those shapes being complementary to each other, and the joint portion 50 may electrically connect the electrode terminal protrusion portion 51 and the metal terminal portion 52 at side surface portions of the concave shape and the convex shape at which the electrode terminal protrusion portion 51 the metal terminal portion 52 are engaged with each other. For example, when the honeycomb structural body is formed of a Si-bonded SiC ceramic, the high electrically conductive portion 42 may have a higher metal Si content.

Next, a method for manufacturing a joined body of the present invention will be described. The method for manufacturing a joined body of the present invention may include: a joining step of forming a laminate in which a joint layer containing a Fe metal powder is provided between a first member and a second member, and firing this laminate in a lower temperature range than the melting point of a Fe oxide to form a joint portion joining the first member and the second member. Alternatively, the method for manufacturing a joined body of the present invention may include: a joining step of forming a joint layer containing a metal powder of a transition metal and an oxide powder of a transition metal between a first member and a second member so that the addition amount of the oxide powder with respect to the total of the metal powder and the oxide powder is in a range of 2 to 10 percent by mass, and firing in an oxidising atmosphere at a firing temperature of 750° C. to 850° C. for a holding time of 5 hour or less so as to form a joint portion which at least partially includes a mixed layer containing metal of the transition metal and an oxide thereof and which joins the first member and the second member.

(Joining Step)

As a transition metal used for the joint portion, for example, Fe, Mn, Co, Ni, and Cu may be mentioned. Among those mentioned above, at least one of Fe and Cu is preferably used. As a raw material of the joint portion, a metal powder of a transition metal is preferably used. In addition, when Fe is used as the transition metal, to the raw material used for the joint portion, a solid solution component powder containing a solid solution component capable of forming a spinel structure is more preferably added. Accordingly, since the solid solution component is solid-dissolved in the Fe oxide, the thermal stability can be further enhanced. As the solid solution component, at least one of Mn, Co, Ni, Cu, and Zn nay be mentioned. The solid solution component may be, for example, either a metal powder or an oxide powder containing a solid solution component. In addition, as the raw material of the transition metal, a transition metal oxide is not appropriate as the raw material of the joint portion since the joining between the first member and the second member is not sufficiently formed even by a heat treatment. The addition amount of the solid solution component is, as a blending rate to the entire joint portion, preferably 0.5 percent by mass or more, more preferably 1 percent by mass or more, and further preferably 2 percent by mass or more. The addition amount of this solid solution component is, as a blending rate to the entire joint portion, preferably 30 percent by mass or less, more preferably 25 percent by mass or less, and further preferably 15 percent by mass or less. The addition amount of this solid solution component (an oxide powder of a transition metal) is specifically preferably 10 percent by mass or less.

As this raw material powder, for example, a powder having an average particle diameter in a range of 1 to 40 µm is preferably used. In the range described above, an appropriate joining strength is likely to be obtained. The average particle diameter of the raw material of this joint portion is preferably 30 µm or less, more preferably 10 µm or less, and further preferably 5 µm or less. In addition, this average particle diameter is more preferably 3 μm or more. In this step, at least two raw material powders having different particle sizes are preferably mixed together to form a raw material powder of the joint portion. Accordingly, the joining strength at the joint portion can be further increased. The Fe metal powder may be prepared by mixing a first powder having a predetermined average particle diameter (μm) and a second powder having an average particle diameter (μm) larger than the predetermined average particle diameter. The second powder is preferably used in order to improve the strength of the joint portion itself. The average particle diameter of the first powder may be set in a range of 0.1 to 10 (μm), and the average particle diameter of the second powder may be set in a range of 10 to 100 (μm). In addition, the average particle diameter of this raw material powder indicates the median diameter (D50) measured by a laser diffraction/scattering particle size distribution measurement apparatus using water as a dispersion medium.

In the joining step, the laminate may be fired in the air as oxidizing atmosphere or may be fired in the air after a heat treatment is performed in a non-oxidizing atmosphere. As the non-oxidizing atmosphere, for example, a nitrogen atmosphere or a rare gas atmosphere (Ar or He) may be mentioned. A joining temperature (firing temperature) may be appropriately selected as long as being in a lower temperature range than the melting point of the Fe oxide and is preferably 400° C. to 900° C. In this temperature range, at least a part of the metal powder of the joint portion can be oxidized. Although this joining temperature is set in an appropriate range in accordance with the material of the joint portion, the joining temperature is more preferably 500° C. or more and further preferably 600° C. or more. In addition, the joining temperature, is more preferably 850° C. or less and further preferably 800° C. or less. This joining temperature is preferably higher in view of sufficient oxidation and is preferably lower in view of energy consumption. As described above, a joining treatment can be performed in a simple atmosphere, such as in the air, and at a low temperature, such as 900° C. or less. In addition, in this step, the firing is preferably performed so that the porosity of the joint portion 30 is 60 percent by volume or less, and the porosity is more preferably 50 percent by volume or less and further preferably 30 percent by volume or less. The joint portion 30 is more preferably a dense body in view of the joining strength. In addition, in this step, the firing is preferably performed so that the porosity of the joint portion 30 is 5 percent by volume or more, more preferably performed so that the porosity is 10 percent by volume or more, and further preferably performed so that the porosity is 20 percent by volume or more. The joint portion 30 more preferably has pores in view of stress relaxation. The firing temperature, for example, may be 5 hours or less and is more preferably 1 hour or less. The holding time is preferably shorter in view of energy consumption.

A method for forming a gradient layer including a first layer, a second layer, and a mixed layer as the joint portion can be performed by controlling the diffusion of oxygen to be supplied, for example, through adjustment of one of the thickness of the joint portion, the addition amount of the solid solution component, the firing temperature, the firing time, the shape of the joint portion, and the material of the first member 21. For example, when the firing temperature is increased, since the oxygen diffusion is promoted, the thickness of the first layer which is more oxidized is increased, and the thickness of the second layer and/or the thickness of the mixed layer, each layer containing a low valence material, is decreased. In addition, when the addition amount of the solid solution component to be solid-dissolved in a transition metal is changed, the thickness of each layer can be changed. For example, in the case in which the transition metal as a primary component is Fe, and the solid solution component is NiO, when the joint portion is formed only from Fe, since the volume expansion occurs by oxidation, a physical space in the joint portion is decreased as the temperature is increased, and the direct contact frequency with oxygen is decreased in the joint portion, so that oxidation is not likely to occur. On the other hand, when an oxide having a small volume change as compared to that of the primary component is added, even if the firing temperature is set in a relatively high range, the physical space can be retained; hence, oxidation can be allowed to proceed to the inside. Accordingly, when the addition, amount of an oxide containing a solid solution component is increased, the space is increased, and oxidation is likely to proceed to the inside, so that the thickness of the mixed layer can be decreased. In addition, when the first member is porous, and oxygen is supplied only from a first member side (for example, in the case in which side surfaces of the joint portion in FIG. 1 are sealed), oxidation of a transition metal occurs from the first member side, and hence, the gradient layer described above is likely to form. In the case of a shape, such as a cap-type electrode portion shown in each of FIGS. 3 and 4, in which oxygen is supplied only from one direction as compared to the shape of a common plate-like joined body, since the supply amount and the supply direction of oxygen, are limited, the gradient layer is likely to form. In addition, when the first member is a dense material, if a raw material is adjusted to form a multilayer structure, the gradient layer can be formed. For Example, after at least two types of powders adjusted in advance to have different values of a mixing ratio between metal of a transition metal and an oxide are prepared, a raw material powder is formed so that the amount of the metal is increased from the first member (low CTE member) to the second member (high CTE member) to form a multilayer structure, and firing is then performed in an oxygen atmosphere. By the method described above, the gradient, layer can also be formed. In particular, when the transition metal as a primary component is Fe, for example, the composition of raw material powders is adjusted, such as a first powder containing $Fe/Fe_2O_3$ of 5/95 on the volume ratio basis, a second powder containing $Fe/Fe_2O_3$ of 20/80, and a third powder containing $Fe/Fe_3O_4$ of 90/10, powders are formed to form a multilayer structure, and firing is performed in the air. Accordingly, oxygen from a substrate and side surfaces and oxygen in $Fe_2O_3$ are allowed to react with Fe for oxidation, so that the gradient layer can be formed. When a metal powder and an oxide powder are used as raw materials of the joint portion, the addition amount of the oxide powder with respect to the total of the metal powder and the oxide powder is preferably in a range of 10 percent by mass or less and more preferably in a range of 5 percent by mass or less. In addition, the addition amount of this oxide powder with respect to the total of the metal powder and the oxide powder is preferably in a range of 2 percent by mass or more.

In the step described above, firing is preferably performed while the movement of the first member 21 and the second member 22 is restricted. Accordingly, the displacement of the members can be prevented. In addition, it is believed that the first member 21 and the second member 22 can be more reliably joined to each other. Incidentally, the term "restriction of movement" may include, for example, the case in which a metal member is fixed by applying a load thereto which may be given by a holding jig or the like. Although it is possible to fix the first member 21 and the second member 22 by positively applying a pressure, the treatment as described above is preferably omitted in view of simplification of the manufacturing step.

In the joined body 20 of the embodiment described above, the first member 21 and the second member 22 are joined to each other by the joint portion 30 which at least partially includes the mixed layer 33 containing metal of a transition metal and an oxide thereof. Since containing the oxide besides the metal, this joint portion 30 has a thermal history resistance superior to that of a joint portion formed of a metal. Hence, the two members can be more reliably joined to each other. In addition, the joint body 30 is obtained by firing after a joint layer containing a metal powder of a transition metal is formed and is able to join the two members by a simple step.

In addition, the present invention is not limited at all to the embodiments described above, and of course, it is to be understood that the present invention, say be carried out in various modes without departing from the technical scope of the present invention.

EXAMPLES

Hereinafter, examples in each of which the joined body of the present invention was actually manufactured will be described as experimental examples. In addition, Experimental Examples 3 to 13 to the examples of the present invention, and Experimental Examples 1 and 2 correspond to comparative examples.

[Formation Method]

First, Fe or Cu as a metal powder, a Ni oxide powder if needed as a solid solution component, a poly(vinyl butyral) resin (PVB) as a binder, and terpineol as a solvent were mixed together to form a joint material paste. This joint material paste was applied to a first member and a second member, each of which was an object to be joined, and those members were adhered to each other with the paste provided therebetween. A sample obtained by adhesion as described above was left in the air at 80° C. over one night, so that terpineol was sufficiently dried. A holding jig was placed on this sample so as to prevent the displacement of the two members and was fired (joined) in the air at 200° C. to 800° C. As a firing atmosphere, an air atmosphere or a non-oxidizing atmosphere (Ar) was used. When the heat treatment was performed in a non-oxidizing atmosphere, firing was then performed in the air at 200° C. to 800° C.

[Formation of First Member]

A first member functioning as a low CTE member was formed. As a porous ceramic, a Si-bonded SiC sintered body and an alumina sintered body were formed. As a raw material of the porous ceramic of the Si-bonded SiC sintered body, a "mixed powder" was formed by mixing a SiC powder and a metal Si powder at a volume ratio of 38:22. To the "mixed powder" described above, a hydroxypropyl methylcellulose as a binder, a starch as a pore forming agent, and a water absorptive resin were added together with water, so that a raw material (molding raw material) forming a porous material was obtained. The molding raw material was kneaded, so that a cylindrical molding precursor was formed. The cylindrical molding precursor thus obtained was molded by extrusion using an extruder, so that a honeycomb molded body was formed. Tills molded body was dried in an air atmosphere at 120° C. to form a dried body. This dried body was decreased in an air atmosphere at 450° C. and was then fired in an Ar atmosphere at 1,450° C. at a normal pressure for 2 hours. From a honeycomb porous ceramic obtained as described above, a rectangular parallelepiped sample having a size of 10×20×35 mm was obtained by cutting, so that a substrate (porous ceramic) was obtained. This substrate had a porosity of 40 percent by volume measured by a mercury intrusion method using a mercury porosimeter (Autopore IV9520, manufactured by Micromeritics Corp.) and an average pore diameter of 10 μm measured by a method similar to that described above. As a raw material of die porous ceramic of die alumina sintered body, an alumina powder and a glass powder were mixed together at a volume ratio of 98:2, and a plate-like molded body was formed by press molding. This molded body was fired in an air atmosphere at 1,200° C. at a normal pressure for 3 hours. As described above, a substrate (porous ceramic) having a diameter of 30 mm and a height of 8 mm was obtained. This substrate had a porosity of 40 percent by volume measured by a mercury intrusion method using a mercury porosimeter (Autopore IV9520, manufactured by Micromeritics Corp.) and an average pore diameter of 10 μm.

As a dense ceramic, a ceramic material of $LaCrO_3$ which was a composite oxide material was formed. Lanthanum oxide and chromium oxide were mixed at an equivalent molar ratio, and this mixture was formed into a bar-shaped molded body (10×20×35 mm) by press molding. This molded body was fired in an air atmosphere at 1,600° C. for 2 hours, so that a sintered body was obtained. The porosity of this composite oxide member measured by a mercury intrusion method using a mercury porosimeter was 0.1 percent by volume or less.

[Second Member]

As the second member which was a high CTE member, a stainless steel material (SUS) was prepared. As the stainless steel material, a Cr—Fe-based alloy (SUS430) was used. This metal member was cut into a bar having a size of 3×4×20 mm, and this cut sample was used for experiments. In addition, the metal member had a porosity of 0.1 percent by volume or less measured by a mercury intrusion method using a mercury porosimeter.

Experimental Examples 1 to 13

In Experimental Examples 1 to 13, the formation was performed under the conditions shown in Table 1. As for a raw material of the joint portion, the addition amount of the oxide powder was set to 0 to 10 percent by mass with respect to the total of the metal powder and the oxide powder. In Experimental Examples 1 and 2, the joint portion had no mixed layer and was uniform, and in Experimental Examples 3 to 10, the thicknesses of the first layer, the second layer, and the mixed layer were changed. In Experimental Example 11, Cu was used for the joint portion. In Experimental Examples 12 and 13, the first member was changed. In addition, as for the coefficient of thermal expansion, SUS430 has 12 ppm/K, a Si-bonded SiC sintered body has 4.6 ppm/K, an $Al_2O_3$ porous body has 7.0 ppm/K, and $LaCrO_3$ has 9.4 ppm/K.

(Observation of Joint Portion)

Figure 6:
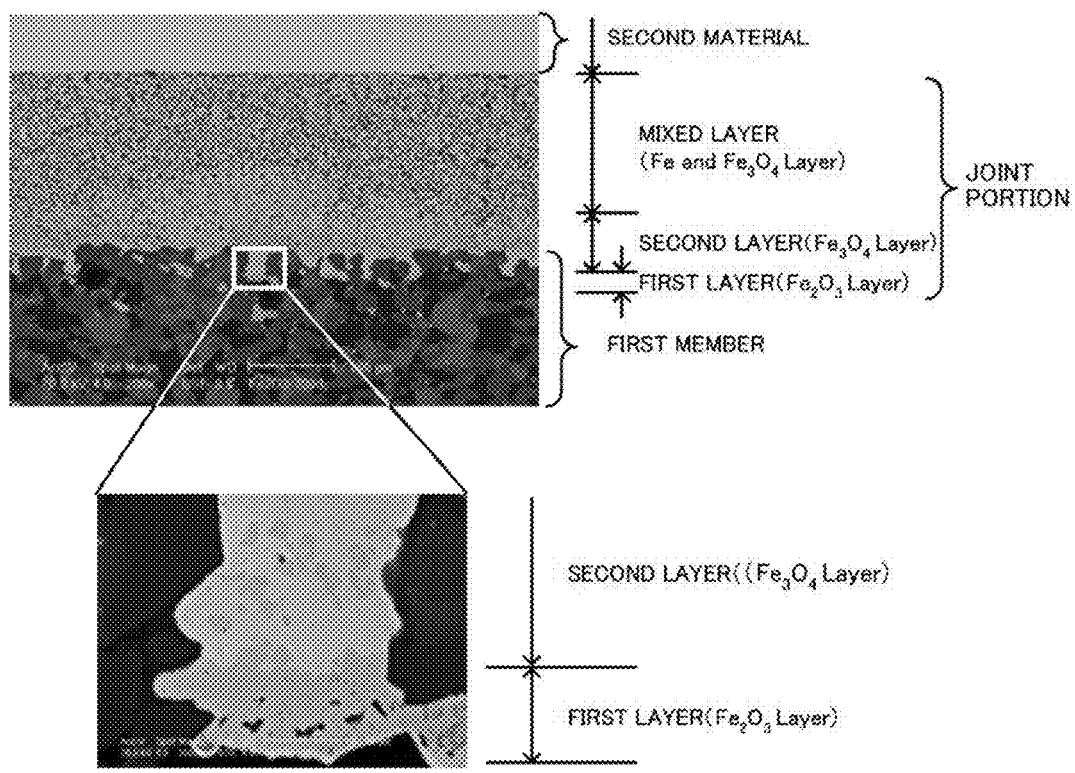
FIG. 6 is a SEM photo of a cross-section of the joined body of Experimental Example 4.

The joint portion of the joined body formed as described above was observed by a scanning electron microscope (SEM). As a result, it was observed that in Experimental Example 3, the joint portion included the first layer and the second layer, and in Experimental Examples 4 to 13, the joint portion included the first layer, the second layer, and the mixed layer. FIG. 6 is a SEM photo of a cross-section of the joined body of Experimental Example 4. As shown in FIG. 6, the joint portion was formed to form a multilayer structure in which from the first member to the second member, the first layer (layer containing a $Fe_2O_3$ phase), the second layer (containing a $Fe_3O_4$ phase), and the mixed layer (layer containing metal Fe and a $Fe_3O_4$ phase) were provided.

(Identification of Crystal Phase)

Figure 7:
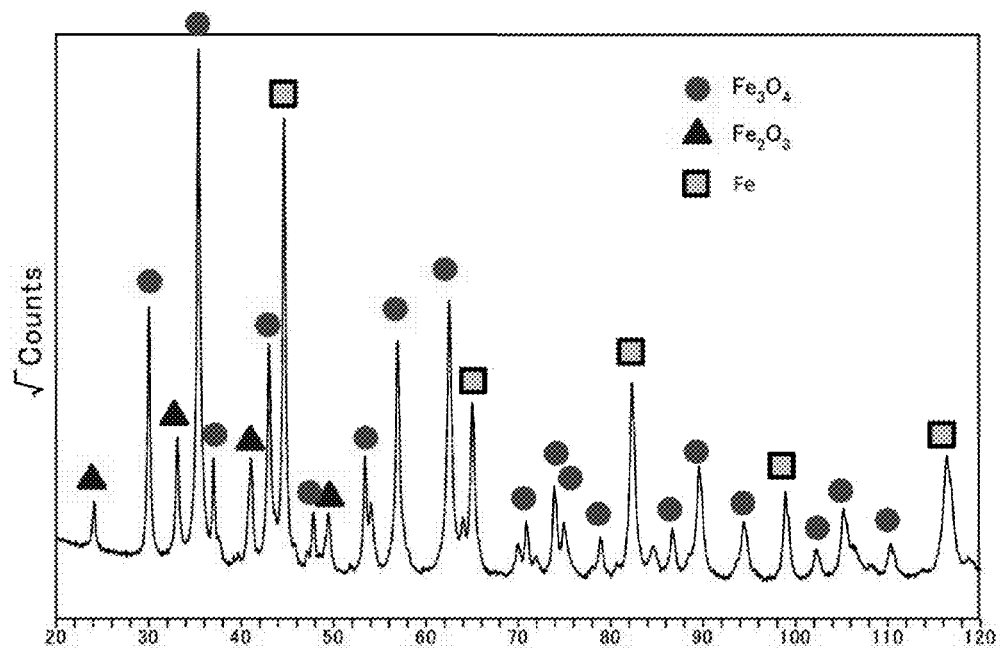
FIG. 7 is the measurement results of the x-ray diffraction of the mixed layer of Experimental Example 5.
Figure 8:
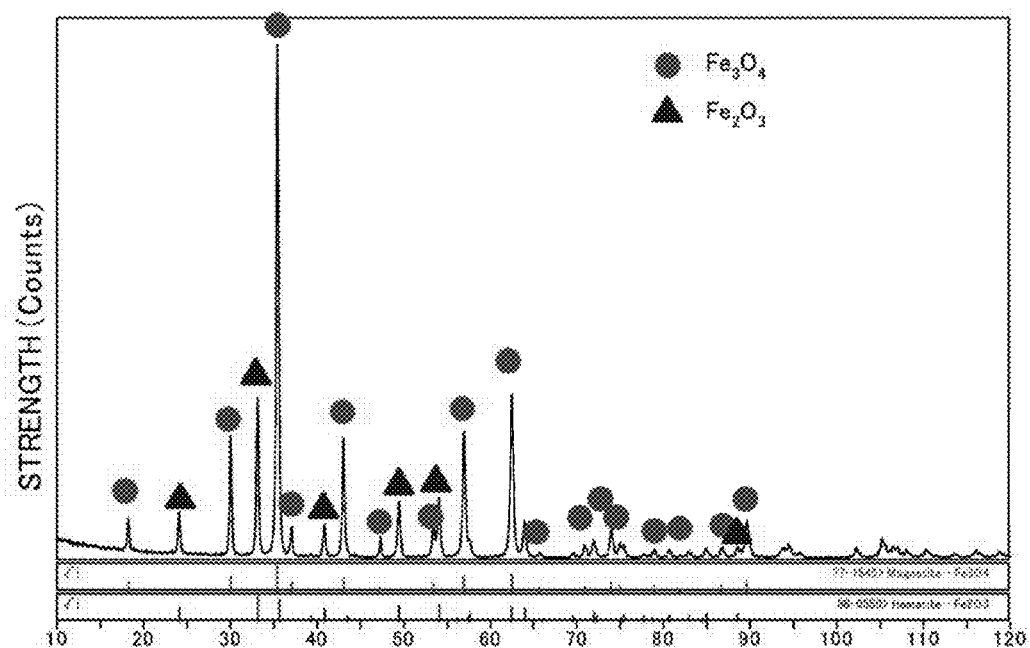
FIG. 8 is the measurement results of the x-ray diffraction of the second layer of Experimental Example 5.
Figure 9:
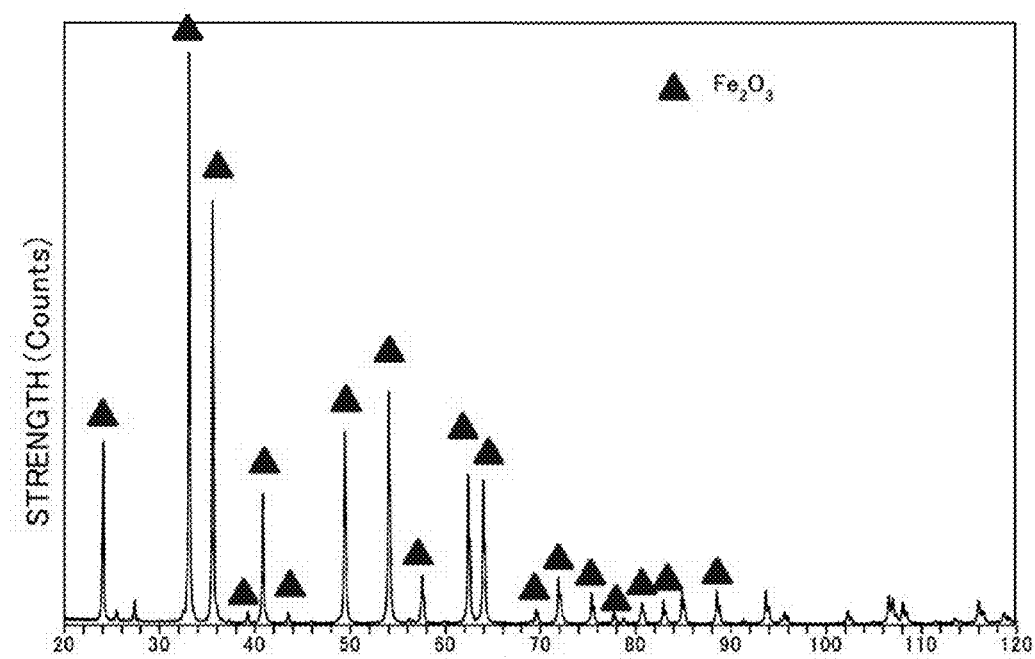
FIG. 9 is the measurement results of the x-ray diffraction of the first layer of Experimental Example 5.

By the use of a rotating anticathode-type x-ray diffraction apparatus (RINT, manufactured by Rigaku Corp.), an x-ray diffraction pattern of the joint portion was obtained. The x-ray diffraction measurement was performed using a $CuK\alpha$ line source at 50 kV, 300 mA, and $2\theta=40°$ to 120°. The measurement was performed using a powder mixed with Si as the internal reference. A measurement sample was cut along a flat plane including a first layer (layer containing a $Fe_2O_3$ phase), a second layer (layer containing a $Fe_3O_4$ phase), and a mixed layer (layer containing metal Fe and a $Fe_3O_4$ phase), and the plane thus cut was measured by x-ray diffraction. In the x-ray diffraction measurement, when NiO was added as the solid solution component, a peak shift amount of the measurement sample was calculated using the peak of the (220) plane of Si as the reference peak and was used as an index indicating the degree of solid solution of a foreign element. As for $Fe_2O_3$, a peak shift amount of 0.02° or more was obtained at the peak of the (410) plane, and as for $Fe_3O_4$, a peak shift amount of 0.02° or more was obtained at the peak of the (751) plane. FIG. 7 shows the measurement results of the x-ray diffraction of the mixed layer (layer containing metal Fe and a $Fe_3O_4$ phase) of Experimental Example 5. FIG. 8 shows the measurement results of the x-ray diffraction of the second layer (layer containing a $Fe_3O_4$ phase) of Experimental Example 5. FIG. 9 shows the measurement results of the x-ray diffraction of the first layer (layer containing a $Fe_2O_3$ phase) of Experimental Example 5.

(Electrical Conductivity of Joint Material)

After a hole having a diameter of 5 mm was formed in a part of the joint portion of a joined body so as to expose the joint material. An Ag electrode having a diameter of 3 mm was baked an the exposed joint material portion, and the electrical resistance was measured by bringing a measurement needle into contact therewith. The resistance thus measured was converted into the volume resistivity using the electrode area and the distance between terminals, and the reciprocal thereof was obtained, as the electrical conductivity. An electrical conductivity of 10 S/cm or more obtained as described above was ranked as "A", an electrical conductivity of 0.1 to less than 10 S/cm was ranked as "B", an electrical conductivity of 0.01 to less than 0.1 S/cm was ranked as "C", and an electrical conductivity of less than 0.01 S/cm or an electrical conductivity which could not be measured was ranked as "D".

(Bending Strength of Joint Material)

Figure 5:
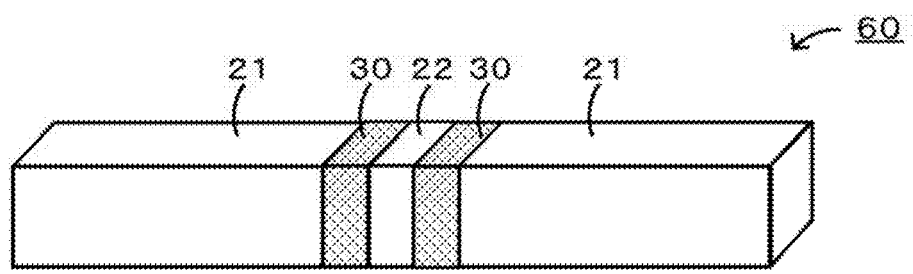
FIG. 5 is an explanatory view of a joined body 60 for mechanical strength measurement.

The joining strength of the joined body was evaluated by a four-point bending test in accordance with JIS-R1632. In Experimental Examples 1 to 13, after two Si-bonded SiC honeycomb bodies each obtained by cutting to have a size of 10×20×40 mm and a SUS430 plate having a thickness of 0.05 mm were joined together using the joint material described above to form the joined body, evaluation was then performed by applying a load thereto. FIG. 5 is an explanatory view of a joined body 60 for mechanical strength measurement. The second member 22 is a SUS430 plate. A joining strength of 3.5 MPa or more measured by the tending strength was ranked as "A", a joining strength of 2.0 to less than 3.5 MPa was ranked as "B", a joining strength of 1.0 to less than 2.0 MPa was ranked as "C", and a joining strength of less than 1.0 MPa or a joining strength which could not be measured was ranked as "D". Incidentally, a joining strength of 3.5 MPa is a mechanical strength of a Si-bonded SiC sintered body, and hence the joining strength of the sample ranked as "A" was higher than the mechanical strength described above.

(Heat Resistance Test and Repeated Heat Resistance Test)

In a heat resistance test, evaluation was performed by measuring the electrical conductivity and the bending strength of the joint material after each sample was held in the air at 850° C. for 24 hours. In a repeated heat resistance test, a cycle in which the temperature was increased in the air from room temperature to 850° C. and was then decreased from 850° C. to room temperature was performed 50 times, and the electrical conductivity and the bending strength after 50 cycles were measured.

(Comprehensive Evaluation)

In accordance with the measurement results described above, the comprehensive evaluation of each sample was performed. The evaluation result of each joined body obtained before the heat resistance test was regarded as the initial characteristic evaluation, and the evaluation result obtained after the heat resistance test was regarded as the heat resistance test evaluation. As for the initial characteristic evaluation, when the initial evaluation, results of the electrical conductivity and the bending strength were all ranked as "A", this sample was ranked as "A". In addition, the initial evaluation results of the electrical conductivity and the bending strength were ail ranked as "B" or more, this sample was ranked as "B". In addition, among the initial evaluation results of the electrical conductivity and the bending strength, when at least one of them was ranked as "C", this sample was ranked as "C". In addition, among the initial evaluation results of the electrical conductivity and the bending strength, when at least one of them was ranked, as "D", this sample was ranked as "D". In addition, the heat resistance test evaluation was performed as was the initial characteristic evaluation. In the comprehensive evaluation, when evaluations of the initial, characteristics, the heat resistance test, and the repeated heat resistance test were all ranked as "A", this sample was ranked as "A". When evaluations of the initial characteristics, the heat resistance test, and the repeated heat resistance test were all ranked as "B" or more, this sample was ranked as "B". In addition, when at least one evaluation of the initial characteristics, the heat resistance test, and the repeated heat resistance test was ranked as "C", this sample was ranked as "C". In addition, when at least one evaluation of the initial characteristics, the heat resistance test, and the repeated heat resistance test was ranked as "D", this sample was ranked as "D".

TABLE 1

| Experimental Example | Low CTE Member | High CTE Member | Raw Materiel of Joint Material | Firing Atmosphere | Firing Temperature ° C. | Firing Time hr | Ratio of Metal Raw Material % by mass | Addition Amount of Oxide % by mass |
|---|---|---|---|---|---|---|---|---|
| 1 | Si- bonded SiC | SUS | Fe | Ar | 700 | 1 | 100 | 0 |
| 2 | | | Fe | Air | 750 | 1 | 100 | 0 |
| 3 | | | Fe,NiO | Ar | 750 | 0.5 | 98 | 2 |
| 4 | | | Fe | Air | 700 | 1 | 100 | 0 |
| 5 | | | Fe | Air | 800 | 1 | 100 | 0 |
| 6 | | | Fe,NiO | Air | 750 | 1 | 98 | 2 |
| 7 | | | Fe,NiO | Air | 750 | 1 | 95 | 5 |
| 8 | | | Fe,NiO | Air | 750 | 1 | 90 | 10 |
| 9 | | | Fe,NiO | Air | 850 | 1 | 98 | 2 |
| 10 | | | Fe,NiO | Air | 850 | 5 | 98 | 2 |
| 11 | | | Cu | Air | 500 | 1 | 98 | 2 |
| 12 | Al$_2$O$_3$ | | Fe,NiO | Air | 750 | 1 | 98 | 2 |
| 13 | LaCrO$_3$ | | Fe,NiO | Air | 750 | 1 | 98 | 2 |

(Results and Discussion)

Measurement results of Experimental Examples 1 to 13 are collectively shown in Table 2. Table 2 collectively shows the materials of the first member and the second member; the thicknesses of the first layer, the second layer, and the mixed layer of the joint portion, and the ratios thereof; the initial characteristics; characteristics after the heat resistance test; characteristics of the repeated heat resistance test; and the comprehensive evaluation. As shown in Table 2, because the entire thickness of the joint portion is thin, a uniform joint portion having no mixed layer is obtained under this firing condition, in Experimental Examples 4 and 5, the diffusion of oxygen was promoted by changing the firing temperature by 100° C., so that the thicknesses of the first layer, the second layer, and the mixed layer (gradient layer) could be controlled. In addition, in Experimental Examples 6 to 8, by changing the addition amount of NiO, the thickness of the gradient layer could be controlled. The reason for this is inferred as follows. That is, when the raw material of the joint portion was only Fe, since the volume expansion, occurred by oxidation, the physical space in the joint portion was decreased as the temperature was increased, and the direct contact frequency with oxygen was decreased in the joint portion; however, when an oxide (NiO) having a small volume change was added, the physical space could be retained in a relatively high firing temperature range, and oxidation, was likely to proceed to the inside. Hence, as the addition amount of an oxide containing a solid solution component was increased, the space was increased, and oxidation was likely to proceed to the inside, so that the thickness of the mixed layer could be decreased. In Experimental Examples 9 and 10, since the temperature was increased, and the firing time was further increased, the diffusion of oxygen was promoted, so that the thickness of the mixed layer could be decreased. In addition, in Experimental Example 11, because of the difference in oxidation temperature between Fe and Cu, the firing temperature was changed. It was found that when the composition of the joint portion and the firing conditions were changed as described above, the thickness of the gradient layer could be controlled.

In addition, as shown in Table 2, it was found that in Experimental Examples 3 to 13 in which the joint portion included the first layer, the second layer, and the mixed layer in this order from the first member to the second member, the electrical conductivity and the heat resistance (bending strength) were excellent. It was found that in this joint portion, when the thickness of the mixed layer was in a range of 10% to 85%, the thickness of the second layer was in a range of 9% to 70%, and the thickness of the first layer was in a range of 1.5% to 15% with respect to the total thickness of the joint portion, the electrical conductivity and the heat resistance (bending strength) were excellent. It was found that as the transition metal of the joint portion, Fe was preferable, and Cu was also preferable. In addition, it was found that as an object to be joined, the first member was more preferably a ceramic, and the second member was more preferably a metal member. In addition, it was also found that as a member to be joined, a porous ceramic or a dense material may also be used. In addition, it was found that when NiO was added to a transition metal (Fe) which was a primary component of the joint portion, since Ni was probably solid-dissolved in a Fe oxide, the decrease in electrical conductivity caused by the thermal history was further suppressed, and the thermal stability could, be further enhanced. It was estimated that in consideration of the relationship with the characteristics of Fe, besides Ni, an element, such as MN, Co, Cu, or Zn, capable of forming a spinel structure may also have an effect similar to that described above.

TABLE 2

| Experimental Example | First Member Low CTE Member | Second Member High CTE Member | Thickness of Joint Portion | | | | | | | Initial Characteristics Electrical Conductivity of Joint Material | |
|---|---|---|---|---|---|---|---|---|---|---|---|
| | | | Total of Joint Portion μm | Mixed Layer μm | Ratio of Mixed Layer % by mass | Second Layer[1] μm | Ratio of Second Layer % by mass | First Layer[2] μm | Ratio of First Layer % by mass | S/cm | Evaluation |
| 1 | Si- bonded SiC | SUS | 201.1 | Not Formed | 0.0 | Not Formed | 0.0 | Not Formed | 0.0 | >10E+06 | A |
| 2 | | | 230.0 | Not Formed | 0.0 | Not Formed | 0.0 | 230.0 | 100.0 | <10E−6 | D |
| 3 | | | 180.0 | 0.0 | 0.0 | 170.0 | 94.4 | 10.0 | 5.6 | 2.5E+01 | A |
| 4 | | | 320.2 | 192.9 | 80.4 | 24.0 | 10.5 | 12.4 | 3.9 | 1.6E+00 | A |

TABLE 2-continued

| Experimental Example | | Bending Strength | Electrical Conductivity S/cm | Evaluation | Bending Strength Evaluation | Heat Resistance Test Evaluation | Electrical Conductivity Evaluation | Bending Strength Evaluation | Comprehensive Evaluation |
|---|---|---|---|---|---|---|---|---|---|
| 5 |  | 332.5 | 155.8 | 56.4 | 67.8 | 26.0 | 26.4 | 7.9 | 1.6E+00 | A |
| 6 |  | 301.9 | 182.1 | 83.3 | 20.9 | 9.5 | 6.0 | 2.0 | 2.5E+01 | A |
| 7 |  | 306.1 | 129.2 | 50.5 | 82.0 | 35.6 | 8.8 | 2.9 | 5.6E+01 | A |
| 8 |  | 316.0 | 119.8 | 44.0 | 101.0 | 42.0 | 9.2 | 2.9 | 4.0E+01 | A |
| 9 |  | 280.0 | 61.8 | 22.0 | 184.8 | 56.0 | 33.6 | 12.0 | 1.3E+01 | A |
| 10 |  | 310.0 | 29.5 | 9.5 | 240.9 | 77.7 | 39.7 | 12.8 | 2.0E+01 | A |
| 11 |  | 376.9 | 246.0 | 83.2 | 27.5 | 9.3 | 13.0 | 3.4 | 3.0E+00 | A |
| 12 | $Al_2O_3$ | 300.0 | 243.0 | 81.0 | 36.0 | 12.0 | 9.0 | 3.0 | 2.2E+01 | A |
| 13 | $LaCrO_3$ | 280.0 | 218.4 | 78.0 | 28.0 | 10.0 | 10.6 | 3.8 | 2.1E+01 | A |

| | Initial Characteristics | | Characteristics after Heat Resistance Test | | | | Characteristics of Repeated Heat Resistance Test | | |
|---|---|---|---|---|---|---|---|---|---|
| Experimental Example | Bending Strength Evaluation | Evaluation of Initial Characteristics Evaluation | Electrical Conductivity S/cm | Evaluation | Bending Strength Evaluation | Heat Resistance Test Evaluation | Electrical Conductivity Evaluation | Bending Strength Evaluation | Comprehensive Evaluation |
| 1 | B | B | <10E−6 | D | D | D | D[3] | D | D |
| 2 | C | D | <10E−6 | D | D | D | D[3] | D | D |
| 3 | C | C | 2.4E+01 | A | B | B | C | C | C |
| 4 | A | A | 9.5E−04 | C | A | C | C | B | C |
| 5 | A | A | 9.5E−04 | C | A | C | C | B | C |
| 6 | A | A | 2.4E+01 | A | A | A | A | A | A |
| 7 | A | A | 5.0E+01 | A | A | A | A | A | A |
| 8 | A | A | 3.6E+01 | A | B | B | A | A | B |
| 9 | A | A | 1.1E+01 | A | B | B | A | B | B |
| 10 | B | B | 1.5E+01 | A | B | B | B | C | C |
| 11 | A | A | 2.9E+00 | A | A | A | A | A | A |
| 12 | A | A | 2.0E+01 | A | A | A | A | A | A |
| 13 | A | A | 1.9E+01 | A | A | A | A | A | A |

[1] $Fe_2O_2$ layer in Fe, $Cu_2O$ in Cu
[2] $Fe_2O_2$ layer in Fe, CuO layer in Cu
[3] Test cannot be performed
[4] E+06 represents $10^6$ · E−06 represents $10^{-6}$ In addition, the present invention is not limited at all to the examples described above, and of course, it is to be understood that the present invention may be carried out in various modes without departing from the technical scope of the present invention.

What is claimed is:

1. A joined body comprising:
   a first member;
   a second member having a high coefficient of thermal expansion as compared to that of the first member; and
   a joint portion which at least partially includes a mixed layer containing metal of a transition metal and an oxide of the transition metal and which joins the first member and the second member,
   wherein in the joint portion, a first layer containing a first oxide of the transition metal, a second layer containing a second oxide of the transition metal having a low valence as compared to that of the first oxide, and the mixed layer are formed in this order from the first member to the second member so as to form a multi-layer structure.

2. The joined body according to claim 1, wherein in the joint portion, with respect to the total thickness of the joint portion, the thickness of the mixed layer is in a range of 10% to 85%, the thickness of the second layer is in a range of 9% to 70%, and the thickness of the first layer is in a range of 1.5% to 15%.

3. The joined body according to claim 1,
   wherein the transition metal is Fe, the first oxide is $Fe_2O_3$, and the second oxide is $Fe_3O_4$, or
   the transition metal is Cu, the first oxide is CuO, and the second oxide is $Cu_2O$.

4. The joined body according to claim 1, wherein in the joint portion, the transition metal is any one of Fe and Cu.

5. The joined body according to claim 1, wherein in the joint portion, the transition metal is Fe, and at least one of Mn, Co, Ni, Cu, and Zn is solid-soluted in the oxide of the transition metal.

6. The joined body according to claim 1, wherein the difference in coefficient of thermal expansion between the first member and the second member is 4.0 ppm/K or more.

7. The joined body according to claim 1, wherein electrical conductivity of the joint portion is $1\times10^{-1}$ (S/cm) or more.

8. The joined body according to claim 1, wherein the first member is a porous material.

9. The joined body according to claim 1, wherein the first member is a Si-bonded SiC material.

10. The joined body according to claim 1, wherein the first member is a material containing a silicide.

11. The joined body according to claim 1,
    wherein the first member is an electrode terminal protrusion portion formed to have a convex shape or a concave shape,
    the second member is a metal terminal portion which is formed so that a portion to be joined to the electrode terminal protrusion portion has a concave shape or a convex shape complementary to the shape of the electrode terminal protrusion portion, and
    the joint portion electrically connects the electrode terminal protrusion portion and the metal terminal portion at a portion between the concave shape and the convex shape at which the electrode terminal protrusion portion and the metal terminal portion are engaged with each other.

12. The joined body according to claim 11,
wherein the electrode terminal protrusion portion and the metal terminal portion form no space between a protruding front end of the convex shape and a bottom part of the concave shape, those shapes being complementary to each other, and the joint portion electrically connects the electrode terminal protrusion portion and the metal terminal portion at side surface portions of the concave shape and the convex shape at which the electrode terminal protrusion portion and the metal terminal portion are engaged with each other.

13. The joined body according to claim 11, wherein the first member is a part of a honeycomb structural body including a partition wall formed of a porous ceramic which forms and defines a plurality of cells, the cells each functioning as a flow path of a fluid and extending from one end surface to the other end surface; and an outer circumference wall formed along the outermost circumference.

14. A method for manufacturing a joined body in which a first member and a second member having a high coefficient of thermal expansion as compared to the first member are joined to each other, the method comprising a joining step of forming a joint layer containing a metal powder of a transition metal and an oxide powder of the transition metal between the first member and the second member so that the addition amount of the oxide powder with respect to the total of the metal powder and the oxide powder is in a range of 2 to 10 percent by mass and performing firing in an oxidizing atmosphere at a firing temperature of 750° C. to 850° C. for a holding time of 5 hour or less so as to form a joint portion which at least partially includes a mixed layer containing metal of the transition metal and an oxide of the transition metal and which joins the first member and the second member, wherein in the joint portion, a first layer containing a first oxide of the transition metal, a second layer containing a second oxide of the transition metal having a low valence as compared to that of the first oxide, and the mixed layer are formed in this order from the first member to the second member so as to form a multilayer structure.

\* \* \* \* \*